O. EPPENSTEIN.
TELEMETER.
APPLICATION FILED OCT. 15, 1912.
1,265,762.
Patented May 14, 1918.
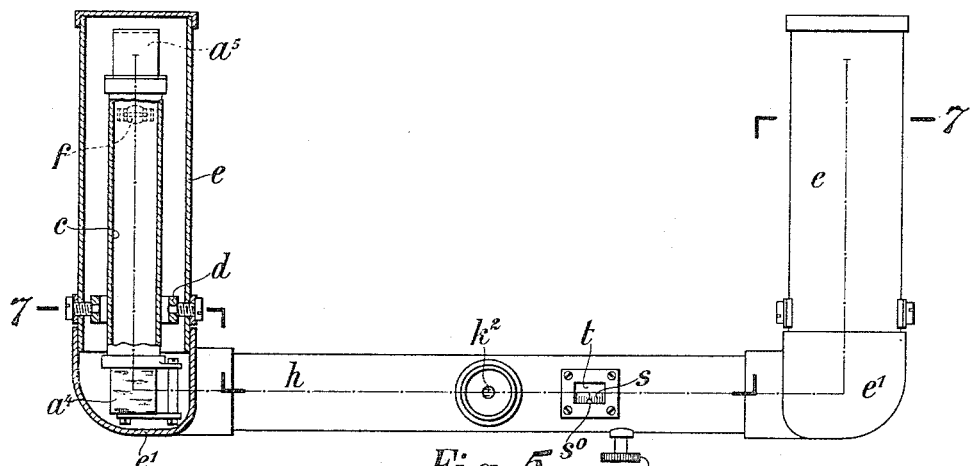
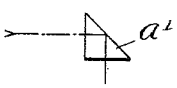
Fig. 1.
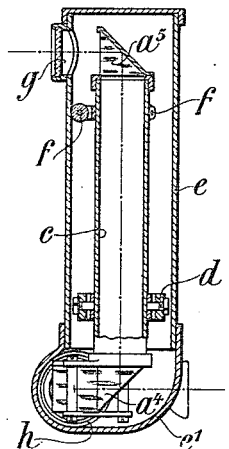
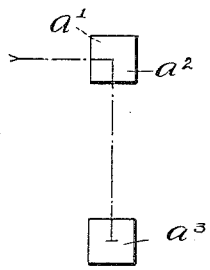
Fig. 3.
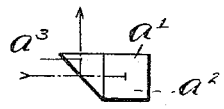
Fig. 2.
Fig. 6.
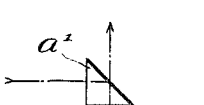
Fig. 4.
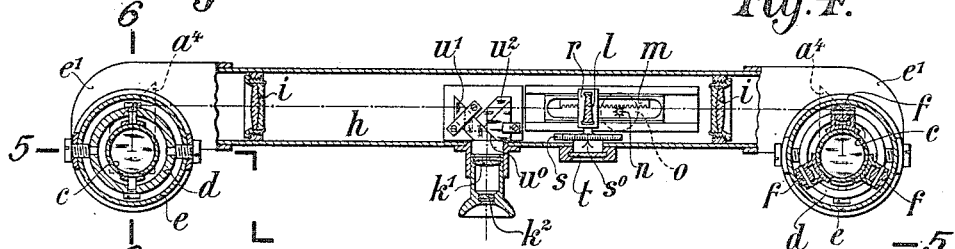
Fig. 7.
Witnesses:
Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

1,265,762.  Specification of Letters Patent.  Patented May 14, 1918.

Application filed October 15, 1912. Serial No. 725,785.

*To all whom it may concern:*

Be it known that I, OTTO EPPENSTEIN, a citizen of the German Empire, residing at Jena, Germany, have invented a new and useful Telemeter, of which the following is a specification.

The invention relates to that kind of telemeter, in which the ocular system lies between the objective lenses and the objective prism systems raise the entrance openings above the head of the observer, each objective prism system being so formed, that the deflection in the plane of triangulation effected by such system of a ray passing through it is not influenced by small rotations, to which the whole objective prism system is subjected in the said plane.

Up to the present only one telemeter of this kind has become known, viz. that one described in the French Patent Specification 425,511. In the instrument there described each of the objective prism systems consists of a pentagonal prism, in front of which two reflecting surfaces, parallel to each other, are disposed in such a manner as to displace the entering ray so as to remain parallel to itself and in a direction perpendicular to the plane of triangulation. This combination however deflects the axial ray four times and necessitates in addition to this a silvering of the two reflecting surfaces of the pentagonal prism.

According to the present invention the objective prism systems are so formed as to cause the axial ray to be deflected only three times in each of them, without their losing the above explained non-sensitiveness to a rotation in the plane of triangulation. An incidental advantage is, that at none of the reflecting surfaces the angle requisite for total reflection is exceeded, so that no silvering is necessary.

The employment of a prism system, which deflects the axial ray only three times and is non-sensitive in the above meaning of the term, as the objective prism system of a telemeter is not new; it is known through the English Patent Specification 3,172 of the year 1901. The prism system is there formed by the cementing together of a once-reflecting and a twice-reflecting prism, a difference in height between the entering and the emerging ray corresponding to the dimensions of the prisms being obtained.

In the above mentioned English patent specification, by cementing the separate prisms to each other or to a glass plate common to them, the unchangeableness in the relative position of the separate prisms is secured; the moving apart of the prisms, as in the telemeters, with which the present invention is concerned, renders it necessary, in order to insure unchangeableness, to protect the constructional part, which serves as carrier for the separate prisms, from alterations in its form. A convenient way of bringing this about is to rigidly fix the separate parts of each objective prism system to a tube (an inner tube) and to journal this inner tube in another tube (an outer tube) yieldingly in such a manner that alterations in the form of the latter are not transmitted to the former.

In the annexed drawing Figures 1 and 2 are diagrammatic views in elevation and plan respectively of a prism system corresponding to the invention. Figs. 3 and 4 are similar views of another such prism system. Fig. 5 is a front elevation partly in section of a constructional example of a uniocular telemeter according to the invention. Fig. 6 is a vertical section through the left-hand objective prism system. Fig. 7 is a sectional plan view of the telemeter along line 7—7 of Fig. 5.

In Figs. 1 and 2 the objective prism system consists of the three reflecting prisms $a^1$, $a^2$, $a^3$ with simple reflecting surface, the contiguous prisms $a^2$ and $a^3$ of which system may also consist of one piece. In Figs. 3 and 4 the system also consists of three simple reflecting prims $a^1$, $a^2$, $a^3$; this system may be regarded as the same as that shown in Figs. 1 and 2, except that the rays pass through it in the opposite sense.

If to the three deflections, which are effected by each of the prism systems shown, be added an odd number of deflections through 90° in the plane of triangulation, caused by reflecting surfaces of the ocular system, standing perpendicular to the said plane, total erection of the image results with each of the systems shown in Figs. 1 to 4. Erection only parallel to the direction of the base-line may be obtained, if one of the reflecting surfaces belonging to the ocular system be formed as a ridge surface. According as the rearmost of the reflecting surfaces belonging to the ocular system is located the exit axis is parallel to the entrance axis and similarly directed or parallel and oppositely directed.

In Figs. 5 to 7 systems corresponding to Figs. 1 and 2 are chosen for the objective prism systems. The two contiguous prisms of each system consist of one piece $a^4$ and are fixed rigidly each at the bottom end of an inner tube $c$, which carries at its top end the third prism $a^5$. The inner tubes are universally journaled, each near its bottom end, by means of a ring $d$ in the outer tubes $e$, which are closed at the top, and are guided, each near its top end, by means of three rollers $f$ coaxially in these outer tubes. A glazed window $g$ serves for each entrance opening. The outer tubes $e$ are rigidly connected by end-pieces $e^1$ with a tube $h$, in which the objective lenses $i$ and the ocular $k^1$, $k^2$ are fixed. A glass wedge $l$, which can be displaced by means of the rack $m$ and the pinion $n$ by the small hand-wheel $o$, serves, on taking a range, for displacing the partial image derived from the right-hand end of the base-line. The half erected scale $s$, which is fixed to the carrier $r$ of the wedge, and the index $s^0$ are visible through the window $t$. The left-hand axial ray is reflected, including the reflection at the separating layer $u^0$, in the separating prism system at three simple reflecting surfaces of the prism $u^1$, the right-hand axial ray suffers a reflection in the separating prism system at the ridge surface of the prism $u^2$. In the image-field the partial image coming from the left-hand end of the base-line is therefore totally erect, that coming from the right-hand end inverted in the direction perpendicular to the base-line.

I claim:

1. Horizontal telemeter with an entrance opening at either end, comprising a horizontal part containing two objective lenses, an ocular prism system lying between the said lenses, an ocular system and a measuring device and comprising further a vertical part at either end of the horizontal part, either vertical part containing an objective prism system adapted to raise the said entrance openings above the head of the observer and consisting of three simple reflecting prisms, the hypotenuse-surfaces of two of which prisms being perpendicular to one plane and perpendicular to each other, while the third prism deflects the axial ray in a plane perpendicular to said plane and parallel to the direction of the axial ray entering the objective prism system.

2. Horizontal telemeter with an entrance opening at either end, comprising a horizontal part containing two objective lenses, an ocular prism system lying between the said lenses, an ocular system and a measuring device and comprising further at either end of the said horizontal part two vertical tubes, an inner and an outer one, each such inner tube having the members of an objective prism system, rigidly fixed to its ends and being yieldingly journaled within and coaxially to the said outer tubes, which latter tubes are themselves rigidly fixed by their bottom ends to the ends of the said horizontal part, and the said objective prism systems being adapted to raise the said entrance openings above the head of the observer and consisting of three simple reflecting prisms, the hypotenuse-surfaces of two of which prisms being perpendicular to one plane and perpendicular to each other, while the third prism deflects the axial ray in a plane perpendicular to said plane and parallel to the direction of the axial ray entering the objective prism system.

OTTO EPPENSTEIN.

Witnesses:
PAUL KRÜGER,
RICHARD HAHN.